United States Patent [19]

Clifford

[11] 4,330,428

[45] May 18, 1982

[54] SMOKE GENERATOR

[75] Inventor: Earl W. Clifford, Getzville, N.Y.

[73] Assignee: The Aro Corporation, Bryan, Ohio

[21] Appl. No.: 268,802

[22] Filed: Jun. 1, 1981

[51] Int. Cl.³ .............................. B01F 3/02; B01J 7/00; G01M 3/04
[52] U.S. Cl. ............................. 252/359 CG; 73/40.7; 73/49.2; 73/49.3; 73/52
[58] Field of Search ....................... 252/359 CG, 305; 40/213; 73/40.7, 49.2, 49.3, 52

[56] References Cited

U.S. PATENT DOCUMENTS

| | | | |
|---|---|---|---|
| 2,945,222 | 7/1960 | Del Mar | 40/213 |
| 3,982,351 | 9/1976 | Waldron | 252/359 CG |
| 4,205,551 | 6/1980 | Clifford et al. | 73/52 |
| 4,271,693 | 6/1981 | Bute | 252/359 CG |
| 4,282,113 | 8/1981 | Kiley | 252/359 CG |

*Primary Examiner*—Bradley Garris
*Attorney, Agent, or Firm*—Sommer & Sommer

[57] ABSTRACT

A smoke generator is adapted to be used with other apparatus for testing the peripheral seal integrity of a package. The smoke generator heats a fuel within a chamber and then aspirates smoke into a conduit through which fluid is flowing. The apparatus includes additional conduits operatively arranged to selectively flush the chamber of ash and other accumulated particulate material.

11 Claims, 8 Drawing Figures

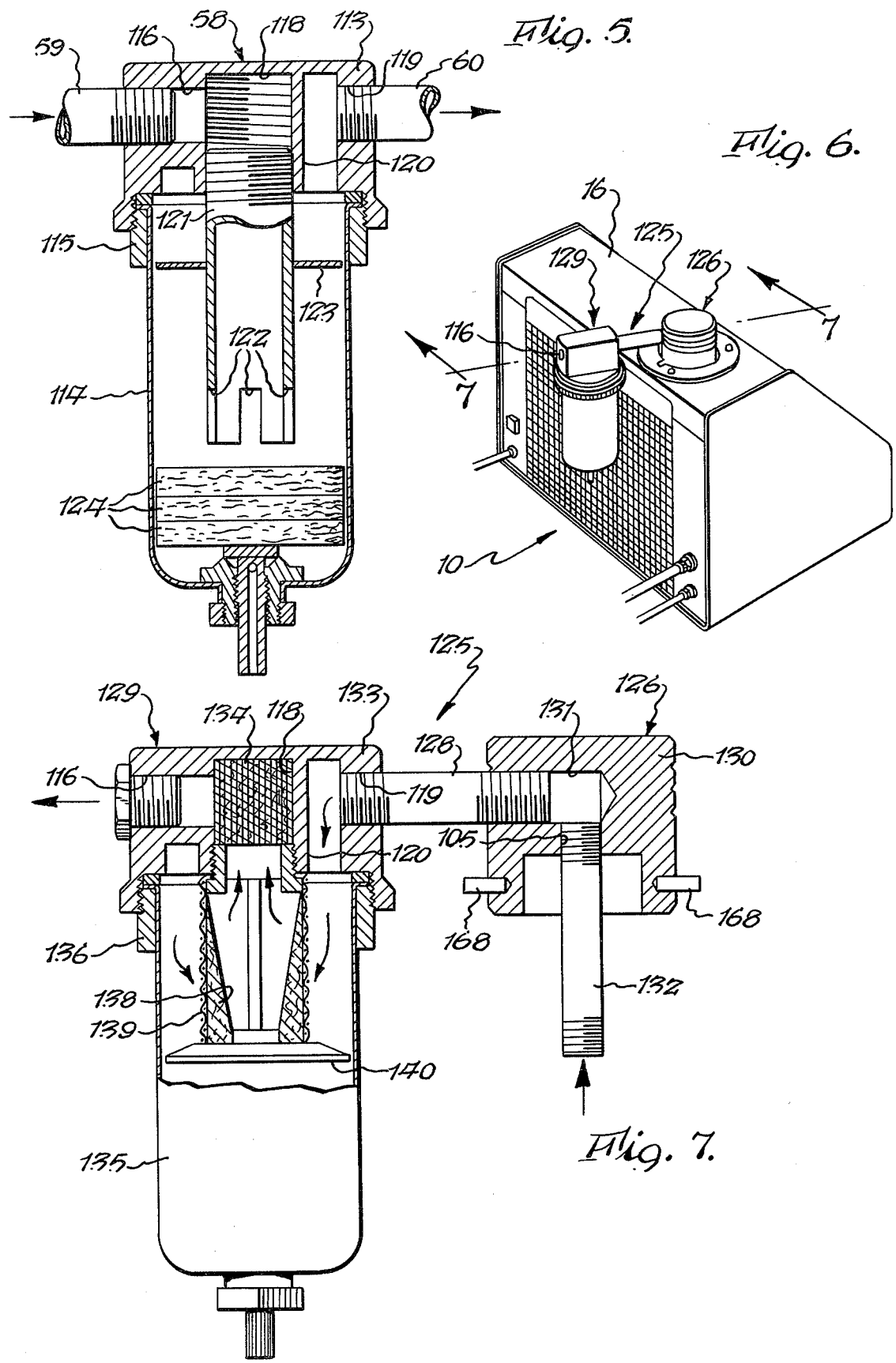

SMOKE GENERATOR

BACKGROUND OF THE INVENTION

1. Field of the Invention

The present invention relates generally to the field of smoke generators, and more particularly to an improved smoke generator which is particularly adapted for use in association with other apparatus, to test the sealing integrity of a package.

2. Description of the Prior Art

Many forms of smoke generators are, of course, known.

U.S. Pat. No. 4,205,551 (Class 73/52), which is assigned to the assignee of the present application, discloses apparatus for testing the strength of a seal provided between an underlying substrate material and an overlying sheet material. That patent mentions the introduction of an optical dye to visibly indicate the locations of leaks and imperfect seals, but does not disclose specific apparatus by which such dye may be generated.

In recent years, flexible packaging has experienced a tremendous growth. Conventional rigid "tin cans" are being progressively replaced by "flexible cans" and pouches. Such pouches are also used in the medical fields to store surgical instruments and the like. Generally, a flexible pouch includes two overlying pieces of sheet material which are secured to one another along the peripheral margins thereof. Depending upon the pouch materials, such seals may be provided by a suitable adhesive, by heat sealing, or by other means.

The growth of flexible packaging has been accompanied by a need to test the integrity of the seals. The degree of sealing integrity is related to the item contained. Food products and sterile surgical instrument require the highest degree of sealing integrity.

In order to test the seal strength, it is common practice today to cut out a portion of the seal, and subject such specimen to a conventional tensile test. This is typically shown in a photograph appearing on page 46 of the September 1980 issue of the magazine, *Paper, Film & Foil Converter* (Maclean-Hunter Publishing Corp.). However, this conventional testing method has a number of serious drawbacks. For example, one never knows whether the test specimen, which has been cut from a larger package, contains an imperfection. If the imperfection were elsewhere, the specimen might pass, without discovery of the leak.

The aforesaid U.S. Pat. No. 4,205,551 discloses apparatus wherein a pouch is tested by inflation. If an optical straining dye is used, the pouch may be visually examined to pinpoint the location of leaks. Indeed, leaks through holes or channels of less than 0.2 microns can be detected. If such leaks recur in the same location, this may indicate a correctable condition.

SUMMARY OF THE INVENTION

The present invention provides an improved smoke generator which is particularly suited for use with such seal testing apparatus.

The improved smoke generator has an inlet adapted to be supplied with a flow of fluid and has an outlet, and is adapted to provide a flow of smoke-entrained fluid through the outlet, and broadly comprises; means forming a chamber; a fuel arranged in the chamber; a heater arranged to contact the fuel and selectively operable to heat the fuel and generate smoke therefrom; a first conduit establishing a flow of the supplied fluid from the inlet to the outlet; a second conduit communicating the chamber with the first conduit; and means for causing smoke in the chamber to be entrained into the fluid flowing through the first conduit.

Accordingly, the general object of the invention is to provide an improved smoke generator.

Another object is to provide an improved smoke generator which is particularly adapted for use in association with seal testing apparatus.

These and other objects and advantages will become apparent from the foregoing and ongoing specification, the drawings, and the appended claims.

BRIEF DESCRIPTION OF THE DRAWINGS

FIG. 5 is an enlarged fragmentary vertical sectional view of the second filter, this view taken generally on line 5—5 of FIG. 2.

FIG. 6 is a perspective exterior view looking at the left rear corner thereof, and showing the clean-out cap in its operative position.

FIG. 7 is an enlarged fragmentary vertical sectional view of the clean-out cap, this view taken generally on line 7—7 of FIG. 6.

DESCRIPTION OF THE PREFERRED EMBODIMENTS

Figure 1:
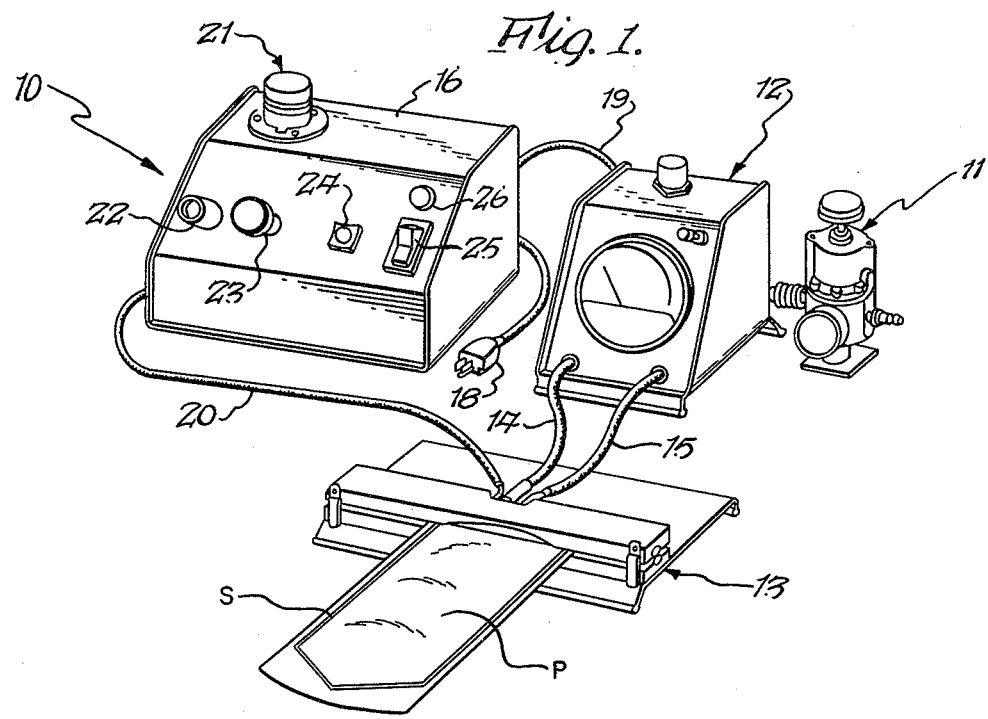
FIG. 1 is a perspective view showing the improved smoke generator in association with other seal testing apparatus.

At the outset, it should be clearly understood that like reference numerals are intended to identify the same structural elements consistently throughout the several drawing figures, as such elements may be further described or explained by the entire written specification, of which this detailed description is an integral part.

Referring now to the several drawing figures, and more particularly to FIG. 1 thereof, the invention provides an improved smoke generator, of which the presently-preferred embodiment is generally indicated at 10.

In FIG. 1, the improved smoke generator 10 is shown in association with other apparatus for testing the integrity of a marginal seal S of a pouch-like container P. Such other apparatus is of the general type disclosed in U.S. Pat. No. 4,205,551, issued June 3, 1980 and specifically includes a pressure regulator 11 arranged to be supplied with a flow of fluid from a suitable source thereof (not shown) and arranged to supply a regulated flow to a flow controller 12, which in turn is used to inflate a pouch having its unsealed margin clamped between the jaws of a fixture 13. Alternatively, such integrity tester may be used in association with a fully-closed pouch. While such fluid may simply be air, the term fluid comprehends gases other than air, as well as suitable liquids. As described in the aforesaid U.S. Pat. No. 4,205,551, fluid is supplied to the pouch through a line 14. Line 15 is used to sense the pressure within the pouch.

Persons skilled in this art will appreciate that many different objects may be placed within pouch P. In the medical environment, such pouches may contain sterile surgical instruments. Recently, there has been a movement away from rigid tin cans, in favor of flexible cans, and "boil-in-bag"-type containers for food. Regardless of the object to be placed within the pouch, it is sometimes desired to test or monitor the integrity of the marginal seals, before the package is closed. The pouch P is typically manufactured of the desired size, and is provided with marginal seals S along all but one side thereof. The user then places the desired object within the pouch and seals the last side. The apparatus depicted in FIG. 1 is shown as being used to test the integrity of the seals of a manufactured pouch. The open side of the pouch is closed by the resilient jaws of fixture 13, after which the pouch is inflated to a desired pressure and examined for leaks.

To facilitate this examination, it is sometimes desired to introduce a suitable smoke into the inflated pouch. The reason for this is that such smoke will visibly stain and therefore indicate not only the existence of a leak, but also its exact location. Some leaks may appear as pin-prick holes in the sheet material of the pouch. Other leaks may occur through the seal, as by a bubble being propagated ahead of a heat sealing roller. Hence, if examination of a number of pouches indicates leaks in a repetitive location, this may indicate that corrective action can be taken. For example, the heat used to provide the seal may be too low or too high, the configuration of the sealing rollers might have to be changed, and so forth. The aforesaid U.S. Pat. No. 4,205,551 discloses the desirability of inflating a pouch with a dye so as to provide the capability of visually examining the pouch for leaks. However, that reference does not disclose or teach the means for generating such a staining dye. U.S. Pat. No. 4,205,551 is hereby incorporated by reference to amplify the reader's understanding of such prior art seal testing apparatus, if the same is needed.

The present invention provides an improved smoke generator, such as indicated at 10, which is particularly adapted for use with such seal testing apparatus (FIG. 1). However, the improved smoke generator is of general utility, and is not limited to this particular end use. As used herein, the term "smoke" is intended broadly to refer to the vaporous product of something heated. The specific feel may be a liquid or a solid, or some other fuel. Such "smoke" may be generated when an appropriate fuel is either elevated in temperature, or caused to smoulder.

Still referring principally to FIG. 1, the improved smoke generator 10 is shown as being provided within an enclosing cover 16, and is arranged to be supplied with electrical power through a suitable plug 18. The smoke generator is also adapted to be supplied with a flow of fluid from flow controller 12 through an inlet conduit 19, and is adapted to provide an outlet flow of smoke-entrained fluid to the interior of pouch P via an outlet conduit 20.

The cover 16 of the smoke generator is shown provided with a number of controls, indicators and elements. These include: a removable cap 21, a push button clean-out valve 22; a flow control valve 23; an activate switch 24, a rocker-type on-off switch 25, and an indicator light 26.

Figure 2:
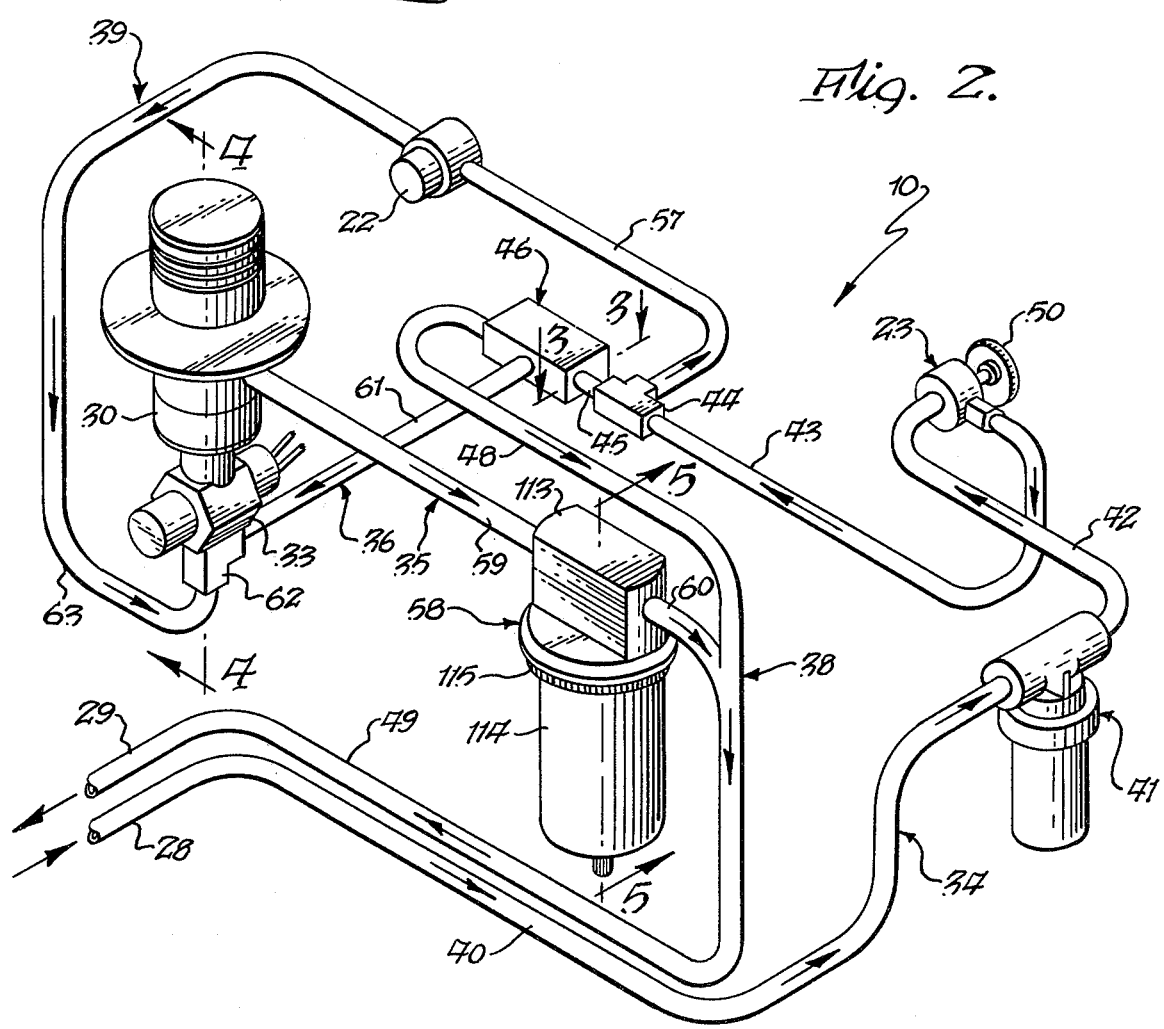
FIG. 2 is a perspective schematic of the pneumatic circuitry thereof.

Referring now to FIG. 2, the improved smoke generator 10 is depicted as including: an inlet 28 adapted to be supplied with a flow of air from conduit 19 (FIG. 1); an outlet 29; means 30 forming a chamber 31 (FIG. 4); a fuel 32 (FIG. 4) arranged in the chamber; a heater 33 arranged to contact the fuel and selectively operable to heat the fuel to generate smoke therefrom; a first conduit 34 establishing a flow of such supplied air from the inlet to the outlet; a second conduit 35 communicating the chamber with the first conduit; and means for causing the smoke in the chamber to be entrained into the fluid flowing through the first conduit. In FIG. 2, the means for causing smoke to be entrained includes a third conduit 36 communicating the first conduit with the chamber to establish a flow through the second conduit 35, an eductor 38 joining the first and second conduits and operatively arranged to aspirate smoke into the first conduit, and a fourth conduit 39 including normally-closed clean-out valve 22 communicating the first conduit with the chamber.

More specifically, first conduit 34 includes (in series): inlet 28, conduit 40, first filter 41, conduit 42, flow control valve 23, conduit 43, Tee 44, conduit 45, manifold 46, conduit 48, eductor 38, and conduit 49 communicating with outlet 29. The rate of flow through the first conduit may be regulated by selective rotation of knob 50 on control valve 23. The Tee 44 is functionally analogous to a conventional T-shaped pipe fitting, and is arranged to supply the flow in conduit 43 to the manifold 46 via conduit 45, and to the fourth conduit 39 as hereinafter described.

Figure 3:
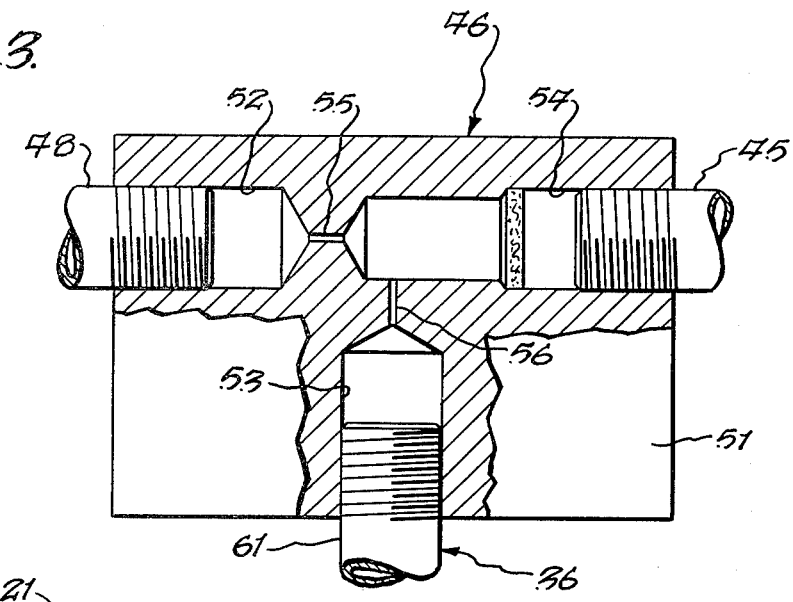
FIG. 3 is an enlarged fragmentary horizontal sectional view of the manifold, this view taken generally on line 3—3 of FIG. 2.

As best shown in FIG. 3, the manifold 46 is a specially-configured member, somewhat analagous to a Tee, but further provided with two restricted orifices. Specifically, manifold 46 includes a rectangular body 51 which is shown provided with a tapped hole 52 extending rightwardly into the body from its left face, a tapped hole 53 extending upwardly into the body from its lower face, and a stepped tapped hole 54 extending leftwardly into the body from its right face. Holes 52 and 54 communicate through a first restricted orifice 55, which in the preferred embodiment has a diameter of about 0.020". Holes 53 and 54 communicate through a second restricted orifice 56, which has a diameter of about 0.0145" in the preferred embodiment. Because of the difference between the diameters of these orifices, the rate of flow through conduit 36 will be less than the rate of flow through conduit 48. The invention contemplates that the diameters of these orifices may be readily changed or varied, as desired. As best shown in FIG. 3, the left marginal end of conduit 45 is threaded into hole 54; the right marginal end of conduit 48 is threaded into hole 52; and the upper marginal end of conduit 36 is threaded into hole 53.

Adverting now to FIG. 2, the second conduit 35 is shown as including a second filter 58 communicating with the heated chamber via conduit 59, and communicating with the eductor 38 via conduit 60. The eductor 38 may be in the form of a Y-shaped fitting, arranged so that smoke will enter the first conduit with a downstream component of velocity, and may be provided with a suitable nozzle (not shown) so as to aspirate or draw the smoke into the first conduit.

The third conduit 36 is shown as being a conduit 61 having one marginal end threaded into manifold hole 53 and having its other marginal end threaded into a block 62 beneath the heater 33.

The fourth conduit 39 includes (in series): a conduit 57 communicating with Tee 44, push button clean-out switch 22, and conduit 63 threaded into the bottom of block 62. Clean-out switch 22 is normally closed so as to block fluid flow through the fourth conduit. When pushed, however, switch 22 opens to supply air at a relatively high rate of flow, since manifold orifices 55 and 56 are bypassed, to the chamber for a purpose hereinafter explained.

Thus, in summary, air supplied to inlet 28 continuously flows through the first conduit 34 at a rate determined by flow control valve 23. Fuel in chamber 31 is heated and the smoke therefrom is aspirated through the second conduit 35 and enters the first conduit at the eductor 38. Air, at a reduced flow rate, passes through the third conduit 36 and enters the chamber. Upon selective operation of switch 22, air at a relatively high flow rate may be admitted to the chamber through the fourth conduit 39.

Figure 4:
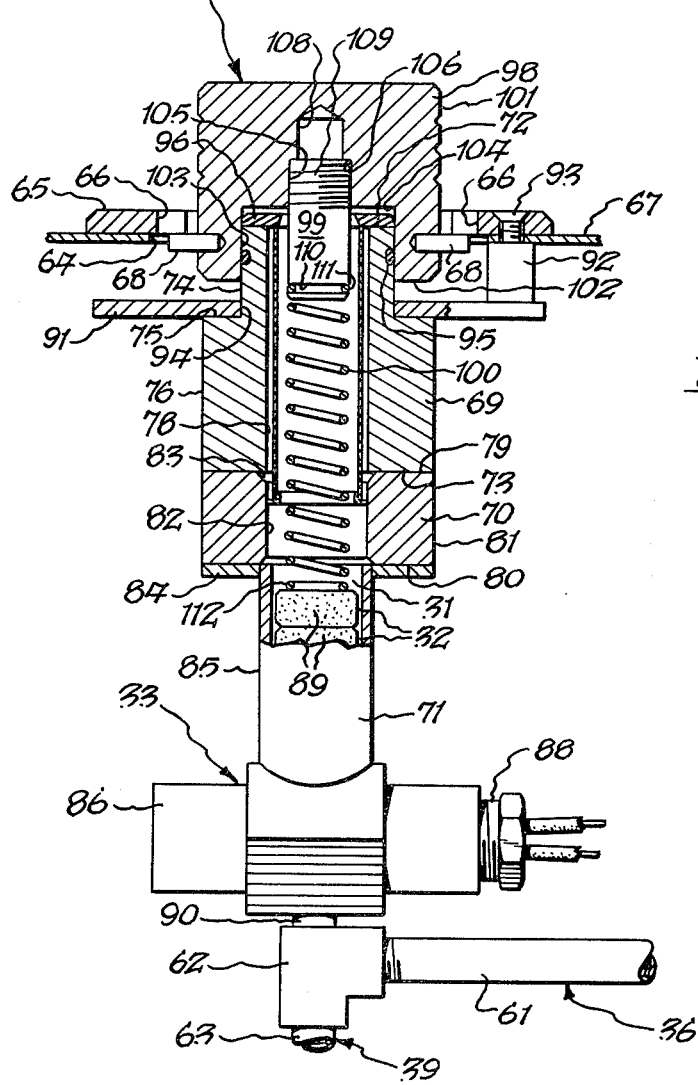
FIG. 4 is an enlarged fragmentary vertical sectional view of the heater assembly and cap, this view taken generally on line 4—4 of FIG. 2.

Referring now to FIG. 4, the enclosing cover 16 is shown as including a horizontal top panel 67 provided with a relatively large diameter vertical hole 64 therethrough. An annular horizontal collar 65 rests on the top panel 67 about opening 64, and is provided with a pair of diametrical slots 66 to accommodate passage of a cap pins 68.

The means forming the chamber 31 includes an upper part 69, an intermediate part 70, and a lower part 71 connected to the heater. The upper part 69 includes an annular horizontal upper face 72; an annular horizontal lower face 73; an outer surface including a cylindrical surface 74 extending downwardly from upper face 72, an upwardly-facing annular horizontal shoulder 75, and a cylindrical surface 76 continuing downwardly therefrom to join lower face 73; and is provided with an axial through-bore bounded by cylindrical surface 78.

The intermediate part 70 includes an annular horizontal upper face 79 abutting the upper part lower face 73; an annular horizontal lower face 80; a cylindrical outer surface 81; and an axial through bore communicating with the bore of the upper part. The intermediate part bore is bounded by a cylindrical surface 82 of approximately the same diameter as the upper part bore surface 78, and by an upper chamfered annular surface 83.

The lower part 71 is a tubular member provided with an out-turned horizontal annular flange 84, the upper face of which abuts intermediate part lower face 80. This lower part 71 has a cylindrical outer surface 85, and a cylindrical inner surface of approximately the same diameter as and aligned with intermediate part surface 82. The lower marginal end of this lower part 71 is suitably affixed to a body 86 containing an electrical resistance heating element 88, such that the lowermost one of a stack of fuel pellets, severally indicated at 89, is in contact with the heating element.

The block 62 is functionally analagous to a Tee-shaped pipe fitting and communicates with the heater assembly 33 through a short conduit 90. Hence, fluid entering the block 62 via conduits 61 and 63 is directed upwardly and flows around heating element 88 and pellets 89 to enter the chamber 31.

The upper, intermediate and lower parts 69–71 are suitably secured together so as to form a subassembly. As best shown in FIG. 4, a horizontal mounting plate 91 is positioned in parallel spaced relation beneath cover panel 67, and is retained in this position by plurality of spacing collars, one of which is indicated at 92, and fasteners 93 penetrating horizontal collar 65 and matingly received in plate 91. Mounting plate 91 is shown provided with a large diameter vertical through opening 94. The uppermost narrowed neck of the upper part 69 penetrates plate opening 94 such that its upwardly-facing shoulder 75 will abut the plate's lower surface. These elements are suitably retained in this operative position. The upper part's neck is shown as being further provided with an annular recess in which an O-Ring 95 is mounted. If desired, a resilient washer-like screen member 96 may be mounted on the upper part's upper end face 72.

Still referring principally to FIG. 4, the cap 21 is shown arranged to releasably close the chamber 31. The cap 21 is itself a subassembly of five elements: a body 98; the two pins 68, 68, which extend radially-outwardly from the body at diametrically-opposite locations; a tube 99; and a coil spring 100. The body 98 is a solid member provided with a knurled outer cylindrical vertical surface 101, and has a stepped recess extending upwardly into the body from its lower horizontal annular face 102. This recess is shown as being bounded by a cylindrical surface 103 extending upwardly from lower face 102, a downwardly-facing annular horizontal shoulder 104, a tapped hole 105 continuing upwardly therefrom, a downwardly-facing annular horizontal shoulder 106, and a blind drilled hole 108. The tube has its threaded upper marginal portion 109 matingly received in tapped body hole 105 with its upper end abutting body shoulder 106, and is provided with an annular groove 110 adjacent its lower marginal end. The coil spring 100 has its uppermost convolution 111 snapped into tube recess 110, and is arranged such that its lower end 112 will bear against the uppermost pellet 89. Thus, when the cap is in position, spring 100 is compressed so as to continuously urge the fuel pellets 89 to move downwardly into contact with heating element 88. The cap may be locked in this chamber-closing position by rotating the same such that pins 68, 68 will underlie collar 65. Of course, cover 21 may be selectively removed so as to provide access to the chamber, as when recharging the same with additional fuel pellets.

Referring now to FIGS. 2 and 5, the second conduit filter 58 is employed as a receptacle to catch such ash or other solid particulate material as may be carried into the second conduit 35. Filter 58 includes an uppermost body 113, and a lower bowl 114 having an out-turned peripheral flange at its upper end which is held to the body by a nut 115. Body 113 has a leftward inlet opening 116 adapted to receive the right marginal end of conduit 59, an upwardly-extending blind tapped hole 118 communicating with inlet 116, an outlet opening 119 adapted to receive the left marginal end of conduit 60, and an eccentric annular recess 120 communicating the outlet with the interior of bowl 114. A tubular member 121 has its upper marginal end threaded into body opening 118, and has its lower marginal end portion provided with a plurality of circumferentially-spaced upwardly-extending radial through slots 122, and is further provided with an annular horizontal baffle plate 123 at an intermediate portion of its longitudinal extent. Thus, smoke-entrained air in the second conduit enters the filter through the inlet 116, is directed downwardly through the tube onto the bowl, and rises upwardly around the baffle plate to exit via recess 120 and outlet 119. If desired, one or more filter elements 124 may rest on the bottom of the bowl such that ash or the like may adhere thereto. Hence, the filter 58 does not actually filter or screen out the smoke entrained air in the second conduct. Rather, filter 58 merely acts as a collection receptable in which ash, residue, or other solid particulate matter may settle.

From time-to-time, it will be necessary to clean out ash which will accumulate in the chamber. Such ash will cause additional fuel pellets to be spaced from the heating element. Unless such ash is periodically removed, the efficiency of the heater will be adversely impared. To facilitate this, the invention provides a clean-out filter assembly, generally indicated at 125, which may be temporarily substituted for closure cap 21, as shown in FIG. 6.

As best shown in FIGS. 6 and 7, clean-out cap 125 includes: a replacement cap 126, an intermediate nipple 128, and a filter 129. Replacement cap 126 is shown as having a body 130, similar to cap body 98, but further provided with a horizontal tapped hole 131 communicating with the vertical cap hole 105. In addition, the tube and spring of closure cap 21 are replaced by a simple pipe nipple 132, the upper marginal end of which is threaded into body tapped hole 105. The replacement cap is also provided with pins 168, 168.

The filter 129 is generally similar to filter 58, except that in a few respects. Filter 125 includes a body 133, similar to body 113, except that a filter element 134 is bottomed in hole 118. Filter 125 includes a bowl 135 and nut 136, similar to bowl 114 and nut 115. Filter 125 also includes an annular filter element 138 arranged within a screen 139 and depending from the body down in to the bowl. An annular horizontal baffle 140 is mounted on the lower end of screen 139. Nipple 138 is shown as being a pipe nipple with its right marginal end portion threaded into replacement cap hole 131, and with its left marginal end portion arranged in filter body hole 119.

When the operator desires to remove the ash from the chamber 31, he simply substitutes the clean-out filter assembly 125 for closure cap 21, and depresses the pushbutton clean-out valve 22. Such operation of switch 22 opens the fourth conduit 39 to passage of a relatively high flow of air, which is admitted through the bottom of block 62 and rises upwardly around the heater to enter the chamber and carry such ash or other accumulated matter upwardly. Such flow carries the ash upwardly through nipple 132, replacement cap hole 131, nipple 128, and into the clean-out filter 129. In filter 129, the flow passes through the annular recess 120 and moves downwardly into the bowl and passes about the baffle 140. Contaminated ash-laden air within the bowl passes through filter element 138 and rises upwardly to pass through second filter element 134, and then exits horizontally through body opening 116. Hence, the contaminated air is screened of any entrained solids in filter 129.

Figure 8:
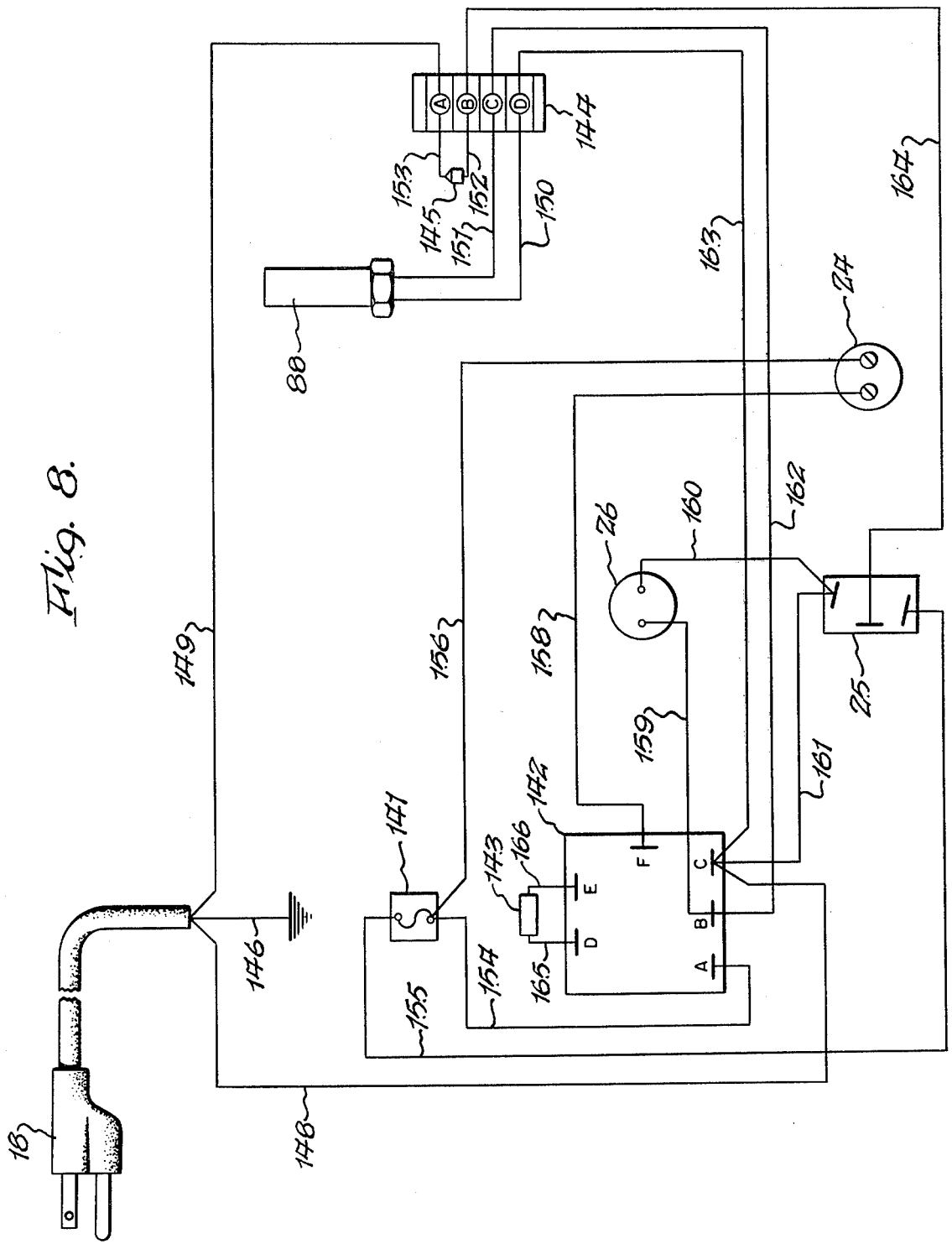
FIG. 8 is a schematic of the electrical circuitry thereof.

An electrical schematic of the improved smoke generator is shown in FIG. 8. Electrically, the smoke generator includes a plug 18 adapted to be supplied with power from a suitable source, such as a conventional wall outlet; a fuse 141; a timer 142 having terminals A–F, a resistor 143 joining timer terminals D and E; indicator light 26; on-off rocker switch 25; heater activate switch 24; heater 88; and a terminal block 144 having four terminals A–D. Terminal strip terminals A and B are connected via a thermal fuse 145.

Plug 18 is of the three-wire type and has one conductor 146 connected to ground; has another conductor 148 connected to timer terminal C; and has its third conductor 149 connected to terminal strip terminal A.

Terminal strip terminal D is connected to terminal C thereof via conductor 150, heater 88, and conductor 151. Terminal strip terminal B is connected to terminal A thereof via conductor 152, thermal fuse 145, and conductor 153. Timer terminal A is connected to rocker switch 25 via conductor 154, fuse 141, and conductor 155; and is also connected to timer terminal F via conductor 154, connected conductor 156, switch 24, and conductor 158. Timer terminal B is connected to timer terminal C via conductor 159, pilot light 26, conductor 160 and connected conductor 161; Timer terminal B is connected via conductor 162 to terminal strip terminal C. Timer terminal C is connected via conductor 163 to terminal strip D. Fuse 141 is connected to terminal strip B via conductor 155, rocker switch 25, and conductor 164. Timer terminal E is connected to terminal D thereof via conductor 165, resistor 143, and conductor 166.

The timer 142 in FIG. 8 serves to control the selective illumination of indicator light 26, so as to visually indicate to the operator that he must wait for a predetermined interval after the apparatus has been turned on (by suitable operation of switch 25) before using the improved smoke generator. After the timer tires out, indicator light 26 will be illuminated, indicating that the apparatus is in a "ready" condition. This time delay feature is provided so that a fuel pellet may be heated to produce the desired smoke, before testing operations are commenced.

Of course, many modifications and changes may be readily made. The electrical and pneumatic circuitry may be readily varied, if desired. Additional features may be added. Some features of the disclosed embodiment may be deleted.

Therefore, while the preferred embodiment has been shown and described, and several modifications thereof discussed, persons skilled in this art will readily appreciate that various additional changes and modifications may be made without departing from the spirit of the invention. Hence, the scope of this invention is to be determined solely by the scope of the following claims.

What is claimed is:

1. A smoke generator having an inlet adapted to be supplied with a flow of fluid and having an outlet, and being adapted to provide a flow of smoke-entrained fluid through said outlet, said smoke generator comprising:
   means forming a chamber;
   a fuel arranged in said chamber;
   a heater arranged to contact said fuel and selectively operable to heat said fuel and generate smoke therefrom;
   a first conduit establishing a flow of said fluid from said inlet to said outlet;
   a second conduit communicating said chamber with said first conduit; and
   means for causing smoke in said chamber to be entrained into the fluid flowing through said first conduit.

2. A smoke generator as set forth in claim 1 and further comprising:
   an eductor joining said first and second conduits and operatively arranged to aspirate smoke into said first conduit.

3. A smoke generator as set forth in claim 1 and further comprising:

a flow control valve arranged in said first conduit and selectively operable to vary the rate of flow through said first conduit.

4. A smoke generator as set forth in claim 1 and further comprising:
a first filter arranged in said first conduit.

5. A smoke generator as set forth in claim 1 and further comprising:
a second filter arranged in said second conduit to prevent solid particulate material from entering said first conduit.

6. A smoke generator as set forth in claim 1 and further comprising:
a third conduit communicating said first conduit with said chamber to establish a flow through said second conduit.

7. A smoke generator as set forth in claim 6 and further comprising:
a fourth conduit communicating said first conduit with said chamber, said fourth conduit including a normally-closed valve.

8. A smoke generator as set forth in claim 7 wherein the rate of flow through said fourth conduit, when said valve is open, is greater than the rate of flow through said third conduit.

9. A smoke generator as set forth in claim 1 and further comprising:
a cap forming a removable closure to said chamber.

10. A smoke generator as set forth in claim 9 and further comprising:
a clean-out filter assembly which may be substituted for said cap and which is adapted to retain solid particulate material.

11. A smoke generator as set forth in claim 10 wherein said clean-out filter assembly is arranged to reduce flow through said second conduit.

* * * * *